UNITED STATES PATENT OFFICE.

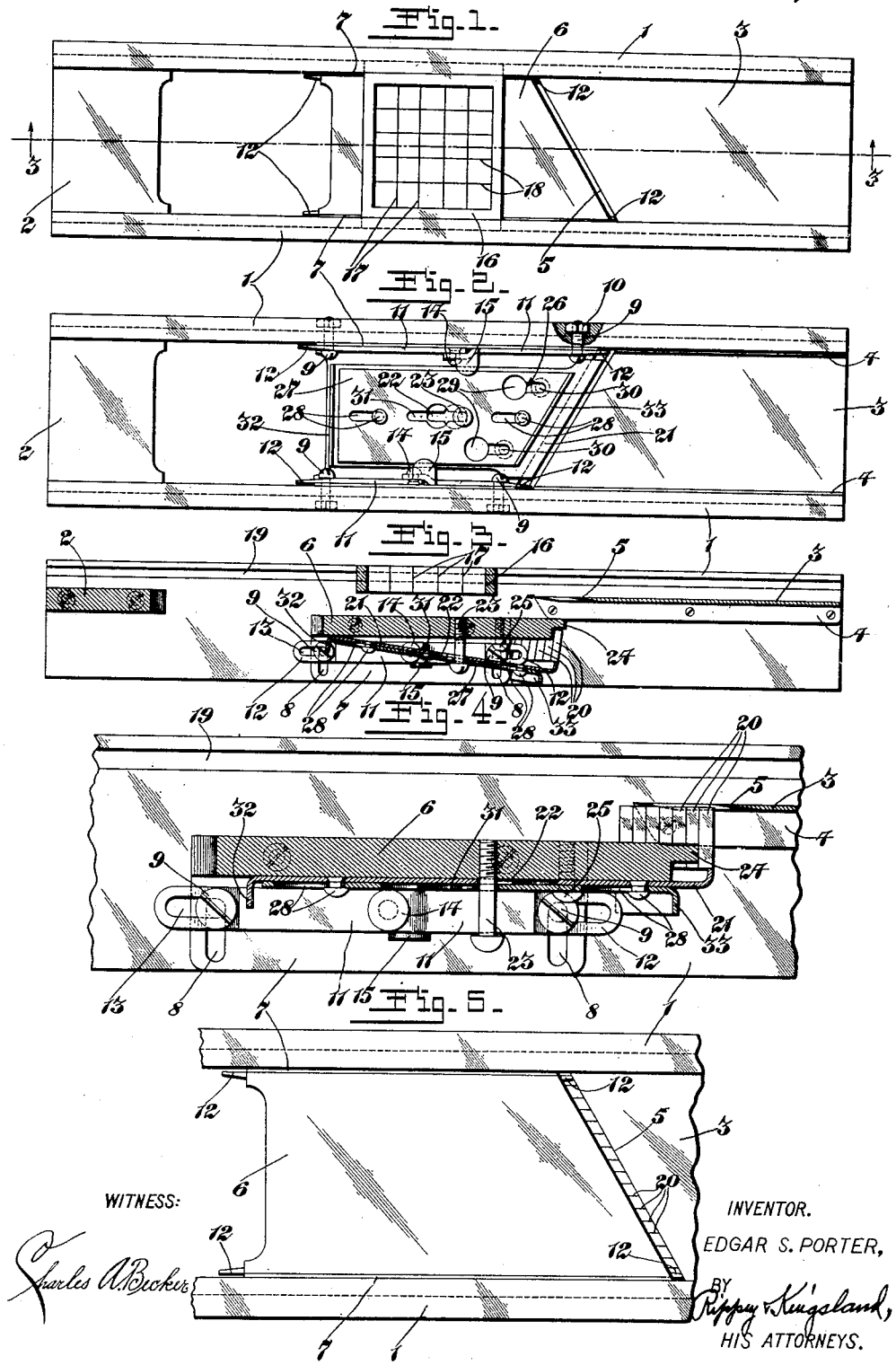

EDGAR S. PORTER, OF CLIFTON, COLORADO.

FRUIT AND VEGETABLE SLICER.

1,371,394.  Specification of Letters Patent.  Patented Mar. 15, 1921.

Application filed June 7, 1920. Serial No. 387,174.

*To all whom it may concern:*

Be it known that I, EDGAR S. PORTER, a citizen of the United States, residing at Clifton, Mesa county, Colorado, have invented a new and useful Fruit and Vegetable Slicer, of which the following is a specification.

This invention relates to a fruit and vegetable slicer.

An object of the invention is to provide a device for slicing vegetables and fruits to any desired thickness or into strips or pieces of different sizes, as desired.

Another object of the invention is to provide a device comprising a knife for cutting fruit or vegetables into slices, a support upon which the fruit or vegetables may be moved toward the knife, and a series of knives arranged in position to cut the slices into narrow strips such, for instance, as cutting potatoes into "shoe string" size.

Another object of the invention is to provide a device for cutting fruit or vegetables into cubes or pieces comprising a support upon which the fruit or vegetables may be moved and cut by an appropriately supported knife, in combination with a frame for moving the fruit or vegetables along the support, and a number of knives mounted in the frame for moving the fruit and vegetables transversely of the cuts formed by the other knife in order to produce the cubes or pieces of the desired size.

An additional object is to provide means for holding the support in different adjusted positions in order to vary the size of the cubes or pieces that will be cut by the knives.

Figure 1 is a top plan view of one form of the invention.

Fig. 2 is a bottom plan view.

Fig. 3 is a longitudinal sectional view along the line 3—3 of Fig. 1.

Fig. 4 is an enlarged sectional view showing particularly the device for cutting potatoes or other vegetables, or fruits, into long strips or shoe strings.

Fig. 5 is a top plan view of the parts shown in Fig. 4.

As shown, the device comprises a pair of side members 1 of appropriate length and vertical width secured together at one end by a connection 2 and at the opposite end by a plate 3 having down-turned edges 4 through which screws pass into the side members. The inner end of the plate 3 is formed with a horizontal knife or cutting edge 5 extending obliquely across between the side members 1.

An improved feature of the invention is the means for cutting pieces or cubes of selected sizes; for instance, for cutting potatoes into sizes for French frying or for cutting fruit or vegetables into cubes or small pieces for soups, stews, salads or other uses. By this means I am enabled to cut the fruit or vegetables into uniform sizes and shapes so as to add to the appearance of the dish when ready for service. As shown, I have provided a support or platform 6 having a relatively wide downwardly extending plate 7 secured to each side edge thereof, the end of the platform or support 6 which is adjacent to the knife 5 is cut in a similar direction; that is, it extends obliquely across between the side members 1 of the device. Near the ends of the plates 7 vertical slots 8 are formed and bolts 9 pass through said slots 8 and through the side members 1 and are retained in position by nuts 10 which are seated in recesses in the side members 1. Thus the platform or support 6 is capable of vertical adjustment so that any fruit or vegetables thereon may be cut into selected sizes; that is, by adjusting the platform or support in its lower position the fruit or vegetables may be cut into pieces or cubes of large size, and by adjusting said platform or support in different positions the sizes of the cubes or pieces may be varied.

A releasable retaining device is provided at each side in connection with the bolts 9 for supporting the platform or support 6 in any desired adjustment and permitting the same to be released easily when desired. As shown, each retaining device comprises a pair of links 11 having their ends beveled as shown at 12 and provided with longitudinal slots 13 through which the bolts 9 extend. The inner ends of each pair of links 11 are overlapped as will be readily understood by reference to Fig. 2, and are pivotally connected by pivots 14. When placed in straight alinement, as shown in Figs. 3 and 4, the beveled ends 12 of the links 11 are wedged tight under the heads of the bolts 9 thus clamping the parts rigidly so that the platform or support 6 will be firmly held in whatever adjustment it may be placed. However, by flexing the toggle formed by each pair of links 11 the thinner portions of the wedge ends 12 of the links will be drawn inwardly under the heads of the bolts 9 thus releasing the clamp and permitting the platform or support to be raised or lowered as desired. When the platform or support is placed in the desired position the links 11 may be again wedged under the heads of the bolts 9 to hold the parts securely in proper position. For manipulating the links 11 one link of each pair may be provided with a lateral extension 15 adjacent to its pivoted end constituting a handle or finger piece for manual engagement.

A frame 16 is movably supported by the side members 1 and is provided with a number of transverse knives 17 and longitudinal knives 18 which intersect the transverse knives so that when any vegetable or fruit is pressed down into the frame, the knives 17 and 18 will form intersecting cuts in the vegetables or fruits. The vegetables or fruit may be pressed down until stopped by the platform or support 6 after which the frame 16 may be moved longitudinally over the knife 5 in order to cut the fruit or vegetables into cubes. As shown, the frame 16 has flanges operating in grooves 19 in the side members 1 so that the frame is easily movable for the purposes described. It is obvious that by reason of the lowering of the platform or support 6 the sizes of the cubes cut as above described may be varied.

For cutting the vegetables or fruit into long strips, I provide a series of knives which may be placed in upright positions below the knife 5 and at the end of the platform 6. Said knives are shown in such adjustment in Fig. 4 and comprise a plurality of blades 20 in connection with the end of a plate 21. The plate 21 is supported at the under side of the platform 6 having a slot 22 receiving a screw 23 extending downwardly from the support or platform 6. The slot 22 in the plate 21 permits longitudinal movement of said plate without disconnecting the plate from the screw 23, so that said plate may be moved from the position shown in Fig. 4 in which the knives 20 are arranged in position for cutting, to the position shown in Fig. 3 in which the knives 20 are out of cutting position. In the position shown in Fig. 3, the ends of the knives bear against a shoulder or ledge 24 near the end of the platform 6. In the position shown in Fig. 4, screws 25 extend through holes 26 in the plate 21.

A latch or retaining device is provided in connection with the plate 21 for coöperation with the screws 25 to hold the plate 21 in position to support the knives 20 for cutting, and to operate the screw 23 to hold the plate 21 in position in which the knives 20 are out of cutting position. Said latch device comprises a plate 27 supported on the plate 21 by pin and slot construction 28, permitting the latch plate 27 to be moved to and from latching position. The plate 27 has holes 29 to permit passage of the heads of the screws 25 therethrough and slots 30 extending from said holes 29 to permit the plate 27 to be moved to position to engage above the heads of the screws 25. This will support the plate 21 as required to retain the knives 20 in cutting position, shown in Fig. 4. When it is desired to move the knives 20 out of cutting position, the plate 27 is moved longitudinally to position to permit the heads of the screws 25 to pass through the holes 29 in the plate 27 and through the holes 26 in the plate 21. When this occurs said plates may be moved downwardly out of engagement with the screws 25 and then longitudinally until the ends of the knives 20 are placed upon the ledge 24. The plate 27 may be kept in position to engage with the head of the screw 23 and for this purpose said plate 27 is formed with an appropriately shaped slot 31. The plate 21 may be provided with a depending flange 32 serving as a handle for engagement to move said plate, and the latch plate 27 may be formed with a depending flange 33 for similar purposes.

As shown there is a considerable space between the platform 6 and the connection 2 through which cubes or pieces of vegetables and fruit may drop. By moving the frame 16 over the said space the fruit or vegetables may be cut without use of the knife 5 simply by pressing the same downwardly to permit the knives 17 and 18 to cut. The pieces cut by the knives 17 and 18 will drop through the opening or space mentioned.

From the foregoing it will be seen that I have provided a very satisfactory device. It may easily be used to cut fruit or vegetables into pieces of uniform size very rapidly and without trouble. The adjustment of the device for use for different purposes is quite simple and, when desired, the movable or adjustable members may be easily taken out and replaced. The device is strong enough for all purposes to which it could properly be used.

I am aware that the construction and arrangement of the parts may be varied without departure from the scope of the invention.

I do not restrict myself to unessential features, but what I claim and desire to secure by Letters Patent, is:—

1. A device of the character described, comprising a movable frame, a series of knives in the frame arranged to cut fruit or vegetables pressed through the frame, a platform below the frame for stopping movement of the fruit and vegetables through the frame, means for supporting the platform at different selected distances from the frame, a plate below the platform, a series of knives on one end of the plate arranged to extend above the platform when said plate is in one position, a latch device for holding said plate in the position in which the knives will extend above the end of the platform, means for releasing said latch device to permit said plate to be moved to position the knives below the platform, an offset portion for engaging the end of the knives to hold them below the platform, and means coöperating with said latch device to retain said plate in position in which said knives will engage said offset portion.

2. A device of the character described, comprising a movable frame, knives supported transversely in the frame, other knives supported in the frame intersecting the transverse knives, all of said knives being arranged to cut the fruit or vegetable forced through the frame, a platform below the frame to stop the movement of the fruit or vegetable forced through the frame, a knife supported in a plane above the plane of the platform and below the plane of said frame arranged to cut off the pieces of the fruit or vegetable below the frame and above the platform, supports upon which said platform is adjustable toward and away from the frame, elements coöperating with said supports to hold the platform at different distances from the frame to vary selectively the length of the pieces cut by the knives in the frame, and means for releasing said elements.

3. In a device of the character described, the combination with side members, and a knife supported by the side members, of a platform located between the side members, plates in connection with said platform adjacent to the side members and having vertical slots therein, elements supported by the side members and passing through said slots, clamping devices coöperating with said supporting elements to support the platform in different adjusted positions, and means for operating said clamping elements to and from clamping positions.

4. In a device of the character described, the combination with side members, and a knife supported between the side members, of a platform between the side members, a depending plate at each side edge of the platform adjacent to said side members and having vertical slots therethrough, supporting elements passing through said slots and supported by the side members, heads on said supporting elements, and clamping devices movable between said heads and said plates to hold said plates and thereby said platform in different adjusted position.

5. In a device of the character described, the combination with side members, and a knife supported between the side members, of a platform between the side members, a depending plate at each side edge of the platform adjacent to said side members and having vertical slots therethrough, supporting elements passing through said slots and supported by the side members, heads on said supporting elements, clamping devices movable between said heads and said plates to hold said plates and thereby said platform in different adjusted positions, and means for moving said clamping devices to and from clamping position.

6. In a device of the character described the combination with side members, and a knife supported between said side members, of a platform between said side members, supports for said platform carried by said side members, heads on said supports, and tapered clamps coöperating with said heads and with said supports to support the platform in different adjusted positions.

7. In a device of the character described, the combination with side members, and a knife supported between said side members, of a platform between said side members, supports for said platform carried by said side members, heads on said supports, tapered clamps coöperating with said heads and with said supports to support the platform in different adjusted positions, and means for moving said clamps to and from clamping position.

8. In a device of the character described, the combination with side members, and a knife supported between said side members, of a platform between the side members below the plane of the knife, a pair of clamping devices supported by each side member, means for moving both members of each pair of clamping devices concurrently to and from clamping position, and means for supporting the platform when said clamping devices are in clamping position.

9. In a device of the character described, a platform, a plate at the under side of the platform, knives on said plate arranged to extend above one end of the platform when said plate is in one position, headed members supported by the platform, and an element movable into latching engagement with said headed members to support said plate in position in which said knives extend above the platform, and movable out of latching engagement with said members to permit removal of the knives.

10. In a device of the character described, a platform, a plate at the under side of the platform, knives on said plate arranged to extend above one end of the platform when said plate is in one position, headed members supported by the platform, an element carried by the plate coöperating with said headed members to support said plate in position in which said knives extend above the platform, and means for moving said element out of engagement with said headed members to permit said plate to be moved to move said knives below the end of the platform.

11. In a device of the character described, a platform, a plate at the under side of the platform, knives on said plate arranged to extend above one end of the platform when said plate is in one position, headed members supported by the platform, an element carried by the plate coöperating with said headed members to support said plate in position in which said knives extend above the platform, means for moving said element out of engagement with said headed members to permit said plate to be moved to move said knives below the end of the platform, and means coöperating with said element to support said plate in position in which said knives are below the platform.

12. In a device of the character described, a platform for supporting fruit or vegetables, a plate at the under side of the platform, knives on said plate, a sliding latch member carried by said plate for supporting said plate in position in which said knives extend above the platform at one end thereof, and means coöperating with said latch member to support said plate in position in which said knives extend above the platform or in which said knives are below the platform, as desired.

13. In a device of the character described, a platform arranged to support fruit or vegetables, a plate below the platform having holes therethrough, headed elements extending through said holes, a latch supported by the first-named plate arranged to engage said headed elements to hold said first-named plate in one position, knives on the first-named plate extending above one end of the platform when said plate is in the position aforesaid, and means for releasing said latch plate from said headed elements to permit said knives to be moved below the end of the platform.

14. In a device of the character described, a platform arranged to support fruit or vegetables, a plate below the platform having holes therethrough, headed elements extending through said holes, a latch supported by the first-named plate arranged to engage said headed elements to hold said first-named plate in one direction, knives on the first-named plate extending above one end of the platform when said plate is in the position aforesaid, means for releasing said latch plate from said headed elements to permit said knives to be moved below the end of the platform, and means coöperating with said latch plate to support the first-named plate in position in which the knives are below the platform.

15. In a device of the character described, a knife for cutting fruit and vegetables, a platform for supporting the fruit and vegetables as they are moved toward the knife, a series of knives at the end of the platform adjacent to the first-named knife for cutting the fruit and vegetables transversely of the cuts formed by the first-named knife, a plate supporting said series of knives, a latch member supported by said plate, and elements carried by said platform engageable by said latch member to latch said plate in position to support said series of knives in or out of cutting position as desired.

16. In a device of the character described, a knife for cutting fruit and vegetables, a platform for supporting the fruit and vegetables as they are moved toward the knife, a series of knives at the end of the platform adjacent to the first-named knife for cutting the fruit and vegetables transversely of the cuts formed by the first-named knife, and a latch device supporting said series of knives in cutting position.

17. A device of the character described, comprising a platform for supporting fruit to be cut, a plate at the under side of the platform, knives supported by said plate and arranged to extend above one end of the platform in one position of said plate, a latch plate carried by said first-named plate, means coöperating with said latch plate for supporting the first-named plate in position to support said knives in cutting position at the end of the platform, and means coöperating with said latch plate to support said first-named plate in position to retain the knives out of cutting position.

18. A device of the character described, comprising a platform for supporting fruit to be cut, a plate at the under side of the platform, knives supported by said plate and arranged to extend above one end of the platform in one position of said plate, a latch plate carried by said first-named plate, means coöperating with said latch plate for supporting the first-named plate in position to support said knives in cutting position at the end of the platform, means coöperating with said latch plate to support said first-named plate in position to retain the knives out of cutting position, and means for moving said plates to their different adjusted positions.

EDGAR S. PORTER.